Aug. 28, 1945.  E. A. REYNOLDS  2,383,930
RETRACTABLE STEP
Filed June 30, 1942   2 Sheets-Sheet 1

EDWIN A. REYNOLDS.
INVENTOR.

BY

Aug. 28, 1945.   E. A. REYNOLDS   2,383,930
RETRACTABLE STEP
Filed June 30, 1942   2 Sheets-Sheet 2
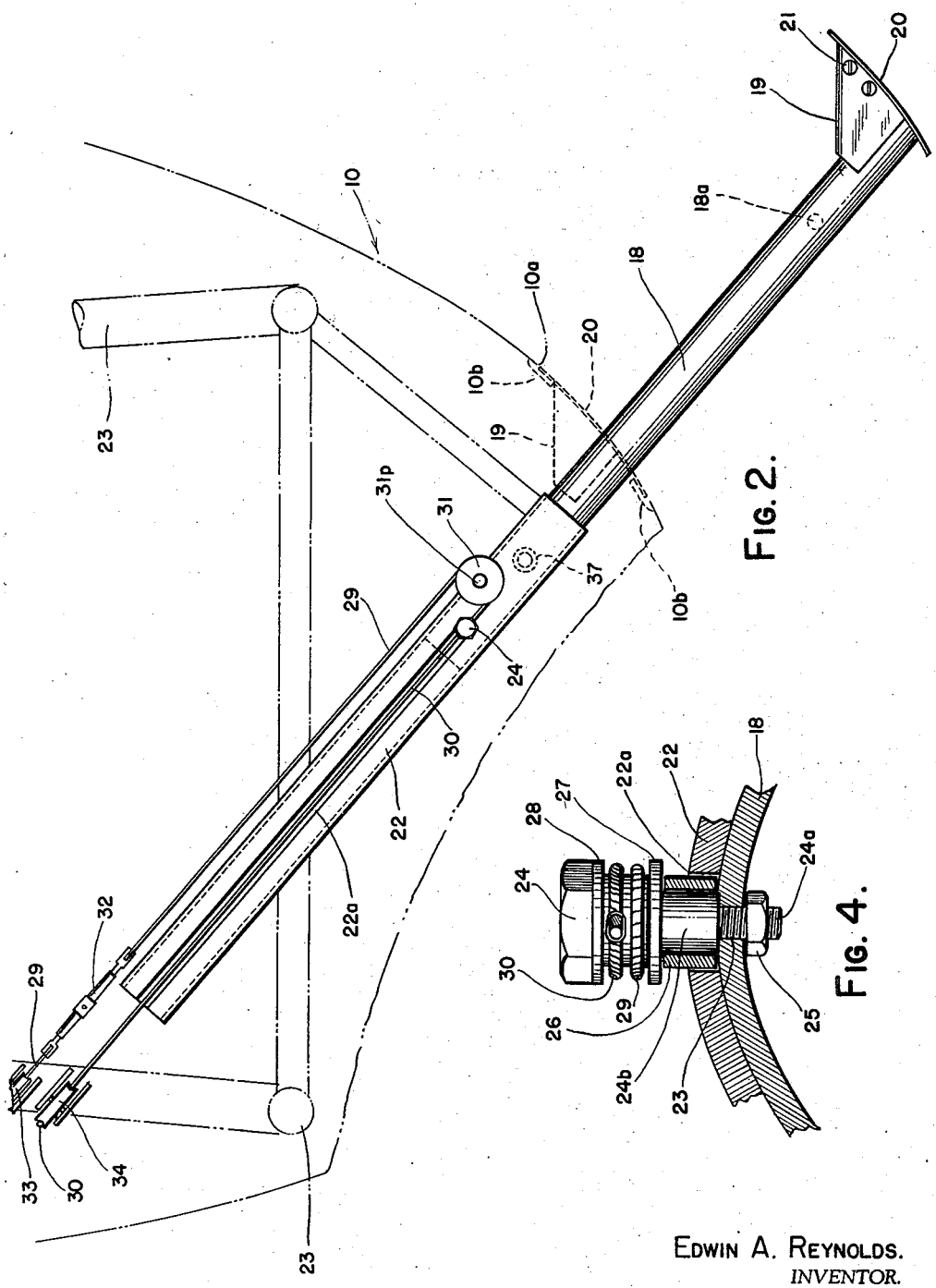
EDWIN A. REYNOLDS.
INVENTOR.
BY James M. Clark Patented Aug. 28, 1945

2,383,930

UNITED STATES PATENT OFFICE 2,383,930

RETRACTABLE STEP

Edwin A. Reynolds, Los Angeles, Calif., assignor to Consolidated Vultee Aircraft Corporation, a corporation of Delaware Application June 30, 1942, Serial No. 449,061

7 Claims. (Cl. 244—129)

The present invention relates to aircraft and other vehicles and more particularly to retractable means for alighting from or gaining access to the cockpits or other portions thereof.

It has heretofore been customary in small aircraft, of both the commercial and military types, to provide means for facilitating the entrance or exit of the pilot or other occupants while the airplane is grounded, by the provision of suitable means upon which he may step in getting into or out of the cockpit. Prior facilities of this type have included step holes within the side of the fuselage, and in the case of biplanes and low-wing monoplanes it has also been customary to provide a covering and suitable reenforcement upon the adjacent areas of the lower wing upon which the occupant may step. Such fuselage step holes have been provided with a spring-pressed plate which is readily displaced by the toe of the shoe of the person using the step and which permits the exterior surface of the fuselage to be faired or made continuous when the step is not in use in order to reduce drag or resistance in flight.

The present invention relates to an improvement in such devices in the provision of a step carried upon the outer terminal of a telescoping member which may be projected through the fuselage at the most desirable point and which when not in use is retracted and faired into the fuselage surface for the elimination of parasitic drag. The telescopic strut of the present invention permits the step to be positioned at a point much nearer to the ground than the prior wing surface or fuselage step, and thereby facilitates access or egress to a far greater extent without the liability of damage to the wing or its associated control surfaces, or to the side wall of the fuselage.

It is accordingly a major object of the present invention to provide a retractable step for aircraft or other vehicles to facilitate access or egress from the enclosed or other parts thereof. A further object resides in the provision of such a step which may be extended to point more readily accessible from the ground than heretofore and which provides for safety to the user in that it is more conveniently located and more readily seen.

It is a further object to provide a step which may be retracted into the wall of the fuselage such that the opening is completely closed and faired to prevent parasitic drag. Further objects of the present invention reside in a novel construction of the retractable step, its support upon the aircraft and the mechanism whereby it may be actuated between its two extreme positions.

Other objects and advantages of the present invention both with respect to its general arrangement and the details of its respective parts, will become apparent to those skilled in the art after a reading of the present specification and the attached drawings forming a part hereof in which:

Fig. 2 shows an enlarged view of the retractable step taken along the lines II—II of Fig. 1;

Fig. 4 is a detailed view of a portion of the telescopic elements and the anchorage bolt for the actuating cables;

Figure 1:
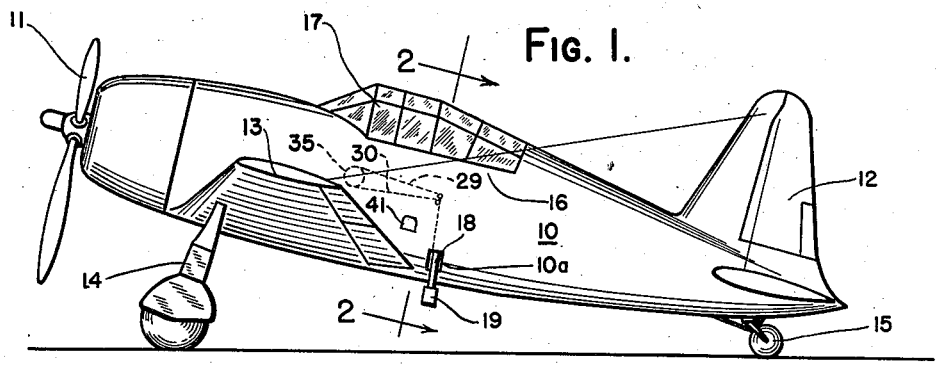
Fig. 1 shows a side elevation of an airplane to which a preferred form of my retractable step has been adapted.

Referring now to Fig. 1 there is shown an airplane comprising a fuselage or body 10, a tractor propeller 11, a tail or empennage assembly 12, and low wings 13. The airplane is supported upon the ground by a suitable main landing gear 14, which may be either the fixed or retractable type mounted beneath the wings or the fuselage, and by a suitable tail wheel or other ground engaging element 15. The fuselage is provided at its central portion with a cockpit, of which the coaming is indicated at 16, and which is covered by means of a transparent cockpit enclosure 17. The parts so designated by numerals to this point are to be found in many small airplanes, particularly of the military type; they have been generally designated as of the conventional type and do not in themselves form a novel portion of the present invention.

Figure 3:
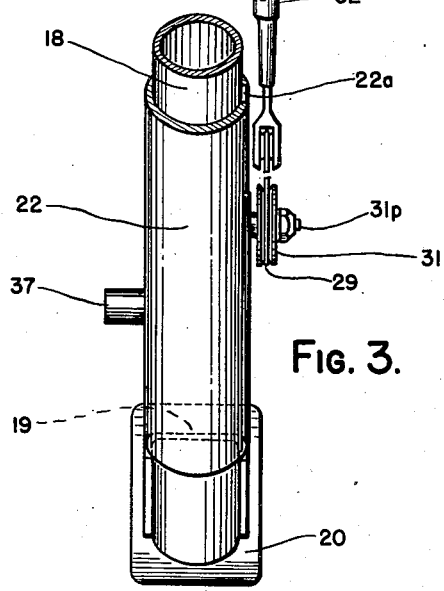
Fig. 3 shows a side elevation of the retractable strut of Fig. 2 as viewed looking outwardly toward the step portion.

Referring now more particularly to Figs. 2 and 3, there is indicated as projecting downwardly and laterally through the fuselage wall 10, a tubular strut 18 carrying upon its lower and outer end a step portion 19 which in turn has attached thereto a curved sheet or plate 20 by means of the screws 21. The strut 18 is of a diameter which permits it to telescope freely within a tubular supporting guide 22 of slightly larger diameter, the outer tube being supported upon the fuselage framework 23 by clamps or other suitable means (not shown). This guide tube 22 is directed toward an opening 10a in the side wall of the fuselage such that as the step-carrying tube 18 is retracted the curved plate 20 completely fills the opening 10a and presents a streamlined contour of the fuselage 10 free from parasitic drag. The periphery of the opening 10a is provided with an offset doubler or reenforcement portion 10b which serves as a stop to limit the upward or inward movement of the step and against which the periphery of the curved plate 20 bears when in the fully retracted and streamlined position, the plate 20 conforming to the general contour of the adjacent fuselage surface.

The fixed tubular strut 22 is provided with a longitudinally extending slot 22a which extends from its upper terminal to a point adjacent its lower terminal. The inner or step-carrying strut 18 is provided with a hole 23 in which a bolt or pin 24 is suitably attached at its threaded stud portion 24a by means of the nut 25, its enlarged intermediate shank portion 24b having concentrically mounted thereupon the cylindrical roller 26. The outside diameter of the latter permits it to slide freely in a guided relationship within the side walls of the longitudinal slot 22a thereby preventing relative axial rotation of the strut 18 with respect to the fixed tubular guide 22. Between the head of the bolt 24 and the roller 26 there is positioned a washer 27 and a flanged collar 28 upon which the actuating cables 29 and 30 are suitably anchored.

The cable 29 is guided over the idler pulley 31 mounted by means of the pivot 31p upon the fixed tube 22. Actually the cables 29 and 30 may be considered as a single endless cable interrupted intermediate their length by the turnbuckle 32 which permits suitable rigging tension to be adjusted within the actuating system. The cable portions 29 and 30 are also guided over the idler sheaves 33 and 34 respectively, which are pivotally attached to the adjacent framework element 23, these sheaves being provided with suitable supporting frames 33a and 34a respectively, each of which are in turn provided with the cable guide pins 33b and 34b. The actuating cables 29 and 30 extend forwardly from the latter sheaves to an actuating drum or sheave 35 pivotally mounted at 35p upon the framework 23 and provided with an operating handle 36.

Figure 5:
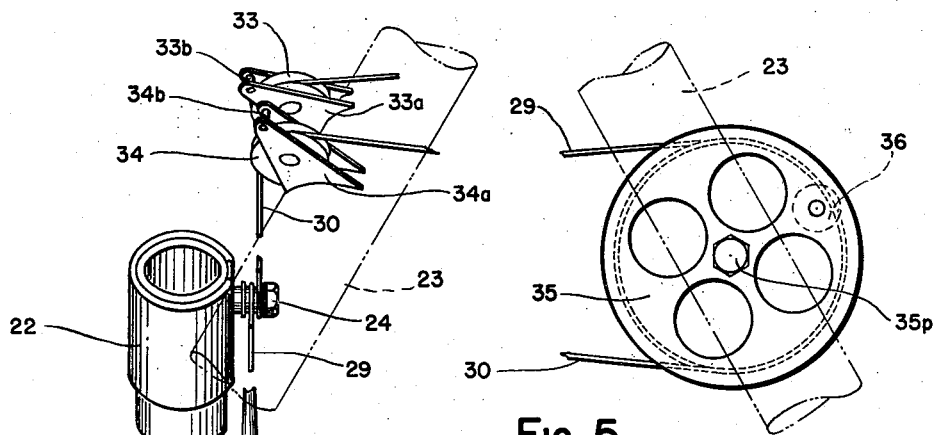
Fig. 5 is a detailed view of the manual actuating mechanism for the step.

It will accordingly be seen that as the handle 36 and the attached drum 35 is rotated in a counterclockwise direction as viewed in Fig. 5, tension is produced in the cable run 30 which, being anchored to the bolt 24 fixedly attached to the step-carrying strut 18, causes the latter to be pulled upwardly and inwardly into a compacted or telescoped relationship with respect to the guide tube 22, relative rotation between the two tubular elements 18 and 22 being prevented by means of the bolt 24 and the surrounding roller 26 engaging the slot 22a.

Figure 6:
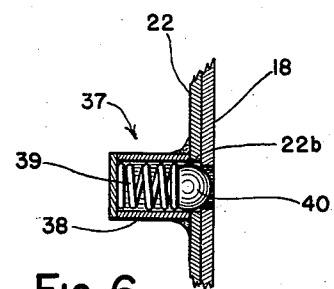
Fig. 6 is a detailed view of the detent for holding the step-carrying member in its retracted position.

In order to retain the strut 18 and the step 19 in its retracted position there is provided a detent 37 as shown in Fig. 6. This detent comprises essentially a cylindrical housing portion 38 welded or otherwise fixedly attached in a radially extending direction to the outer surface of the tubular guide 22. A hole 22b is provided in the wall of tube 22 substantially in alignment with the interior of the detent housing 38 within which is disposed a compression spring 39 and a steel ball 40. A similarly disposed hole 18a of slightly smaller diameter than the ball 40 is disposed within the wall of the step-carrying strut 18 a short distance from the step portion such that in its fully retracted position the two holes 22b and 18a are aligned and the spring 39 urges the ball 40 into engagement with both thereby retaining the two tubular elements in a releasably fixed longitudinal relationship. As the drum 35 is rotated such that tension is created in the cable portion 29, the force of the compression spring 39 is overcome and the ball 40 forced back from the hole in the strut 18, thereby permitting the step 20 to be extended. The present retractable step may be used in certain installations when desirable with one or more of the prior type fixed steps as indicated at 41 in Fig. 1.

The present invention is particularly applicable to small high-powered aircraft having relatively deep fuselages and in which the bottom of the fuselage is relatively greatly spaced above the ground. In such aircraft the location of prior fuselage steps is relatively difficult due to the roundness of the bottom of the fuselage and the desirability of having that type step within the vertically disposed portion of the side wall. The guide or supporting portion of the present step mechanism is preferably disposed behind the pilot seat in a single-seater airplane or between the two seats in a two-seater airplane, although it is not to be limited to either location or type, and is adapted for location in any part of the airplane or other vehicle where a step facilitates access to service, repair or enter any portion of the vehicle.

In a modification of the present invention it has been contemplated that a strut of I-beam cross-section be substituted for the tubular strut 18 and that it be guided within the airplane by means of sheaves or flanged rollers engaging the upper and lower flanges to prevent rotation of the beam about its neutral axis. Other forms and modifications of the present invention, both with respect to its general arrangement and details, which may become obvious to those skilled in the art after a reading of the present description are intended to come within the scope of the present invention as more particularly defined in the appended claims.

I claim:

1. A retractable step for an aircraft having an opening in the wall of its fuselage, an elongated element having a step portion formed on its outer terminal, a guide member fixedly attached within said aircraft fuselage adapted to permit rectilinear movement of said step-carrying element through said fuselage opening, said guide member having opposed longitudinally extending guide faces, an element fixedly attached to said step-carrying element adapted to be moved longitudinally between said opposed guide faces and to prevent relative axial rotation between said step-carrying element and said member, cable means opposedly connected to said rotation preventing element, one of said cable means extending around a sheave pivotally mounted upon said guide member and manual means for movement of said cable means for the actuation of said step-carrying element between its retracted and extended positions.

2. A retractable step for an aircraft having an opening in the wall of its fuselage, an elongated element having a step portion formed on its outer terminal, a guide member fixedly attached within said aircraft fuselage adapted to permit rectilinear movement of said step-carrying element through said fuselage opening, said guide member having opposed longitudinally extending guide faces, an element fixedly attached to said step-carrying element adapted to be moved longitudinally between said opposed guide faces and to prevent relative axial rotation between said step-carrying element and said member, cable means opposedly connected to said rotation preventing element, one of said cable means extending around a sheave pivotally mounted upon said guide member, manual means for movement of said cable means for the actuation of said step-carrying element between its retracted and extended positions, and spring-pressed detent means carried by said guide member adapted to engage said strut-carrying element for its retention in the retracted position.

3. In a retractable step arrangement for aircraft, an aircraft body having a streamlined exterior surface, a strut member adapted for projection and retraction through an opening in said body surface, step means angularly disposed with respect to said member adjacent the outer terminal thereof, fairing means carried upon said member at a position outwardly adjacent said step means, tubular guide means fixed within said aircraft adapted to permit telescoping retractive movement of said strut member through the outer terminal thereof and said surface opening, said guide means provided with a longitudinal slot through the tubular wall thereof, abutment means carried by said strut member guidingly associated with said tubular slot for the prevention of relative rotative movement between said strut member and said guide means and flexible actuating means connected to said abutment means to project and retract said strut member whereby projection of said member provides an operative step outwardly disposed beyond said exterior surface of said body and the opening in said surface is smoothly and continuously faired with the adjoining exterior surface in the retracted position of said member.

4. A retractable step for aircraft having an opening in the exterior wall of its fuselage, a strut member having a step portion formed on its outer terminal, guide means fixedly attached within said aircraft fuselage adapted to permit rectilinear movement of said step-carrying strut through said fuselage opening, rotation prevention means comprising a longitudinal slot in said guide means and a pin element fixedly attached to said step-carrying strut engageable with said slot adapted to prevent relative axial rotation of said step-carrying strut with respect thereto, actuating means connected to said pin elements of said step-carrying strut for the rectilinear movement of said step-carrying strut between its retracted and extended positions.

5. A retractable step for aircraft having an opening in the exterior wall of its fuselage, a strut member having a step portion formed on its outer terminal, guide means fixedly attached within said aircraft fuselage adapted to permit rectilinear movement of said step-carrying strut through said fuselage opening, closure means associated with said outer terminal, rotation prevention means associated with said guide means comprising a longitudinal slot in said guide means and an abutment element fixedly attached to said strut member guidingly associated with said slot adapted to prevent relative axial rotation of said step-carrying strut with respect thereto, flexible actuating means connected to said abutment element of said step-carrying strut for the rectilinear movement of said step-carrying strut between its retracted and extended positions, whereby said fuselage opening is closed in the said retracted position.

6. In a retractable step installation for an aircraft having an opening in an exterior surface thereof, a strut member having a step associated with its outer terminal, tubular guide means fixed within said aircraft adapted to permit telescoping movement of said strut member therewithin through the outer terminal thereof and said surface opening, said guide means provided with a longitudinal slot through the tubular walls thereof, abutment means carried by said strut member guidingly associated with said tubular slot for the prevention of relative rotative movement between said strut member and said guide means and actuating means connected to said abutment means for the telescopic retraction and extension of said step-carrying strut member.

7. In a retractable step installation for an aircraft having an opening in an exterior surface thereof, a strut member having a step carried adjacent the outer end thereof, slotted guide means fixed within said aircraft adapted to permit telescopic retractive movements of said strut member therewithin through the outer terminal of said guide means and through said surface opening, abutment means carried by said strut member guidingly associated within said slotted guide means for the prevention of relative rotative movement between said strut member and said guide means while permitting said telescopic movements and flexible cable means attached to said abutment means adapted for the said telescopic actuation of said strut member between its extended and retracted positions.

EDWIN A. REYNOLDS.